(12) United States Patent
Baxter et al.

(10) Patent No.: US 8,616,514 B1
(45) Date of Patent: Dec. 31, 2013

(54) OFF-ROAD MOTORCYCLE STAND, ADAPTOR AND ASSOCIATED METHOD

(76) Inventors: Mason W. Baxter, Palm Coast, FL (US); Daniel J. Baxter, Palm Coast, CA (US)

(*) Notice: Subject to any disclaimer, the term of this patent is extended or adjusted under 35 U.S.C. 154(b) by 0 days.

(21) Appl. No.: 13/114,705

(22) Filed: May 24, 2011

Related U.S. Application Data (60) Provisional application No. 61/396,195, filed on May 24, 2010.

(51) Int. Cl.
*A45D 19/04* (2006.01)

(52) U.S. Cl.
USPC ....... 248/371; 248/354.5; 108/6; 108/147.21; 254/131

(58) Field of Classification Search
USPC ........... 248/176.1, 354.5, 371, 398, 519, 525; 211/21, 19, 20; 254/10 C, 131, 8 B; 108/5–10, 147.21; 269/901
See application file for complete search history.

(56) References Cited

U.S. PATENT DOCUMENTS

| | | | | |
|---|---|---|---|---|
| 2,960,993 A * | 11/1960 | Holmstrom | | 135/130 |
| 4,460,158 A * | 7/1984 | Chiesa et al. | | 254/124 |
| D378,155 S * | 2/1997 | Bartow et al. | | D34/28 |
| 5,953,999 A * | 9/1999 | Kanehl | | 108/44 |
| 6,089,246 A * | 7/2000 | Barnes | | 135/88.06 |
| 6,095,499 A * | 8/2000 | Johnson | | 254/131 |
| 6,695,268 B1 * | 2/2004 | Hsieh | | 248/188.7 |
| 6,705,596 B2 * | 3/2004 | Reinikka et al. | | 254/134 |
| 7,204,475 B1 * | 4/2007 | Burry et al. | | 254/88 |
| 7,686,549 B1 * | 3/2010 | Posey | | 410/3 |
| D629,995 S * | 12/2010 | Thurm | | D34/35 |
| 2006/0185495 A1 * | 8/2006 | Hsieh | | 84/327 |

* cited by examiner

*Primary Examiner* — Terrell McKinnon
*Assistant Examiner* — Daniel J Breslin (57) ABSTRACT

An off-road motorcycle stand is selectively adjustable between vertically-aligned and vertically-offset positions such that a user can drive a variety of motorcycles to the stand, lean the motorcycle onto the top plate and quickly park the motorcycle. Such a motorcycle stand preferably includes a base, a first support member connected to the base, and a second support member statically attached to the first support member such that the second support member is capable of engaging a portion of an existing motorcycle thereon. In this manner, the first support member may be selectively pivotal between vertically-aligned and vertically-offset positions relative to a centrally registered longitudinal axis of the base.

16 Claims, 7 Drawing Sheets

OFF-ROAD MOTORCYCLE STAND, ADAPTOR AND ASSOCIATED METHOD

CROSS REFERENCE TO RELATED APPLICATIONS

This application claims the benefit of U.S. Provisional Application No. 61/396,195, filed May 24, 2010, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to motorcycle stands and, more particularly, to an off-road motorcycle stand that is selectively adjustable between vertically-aligned and vertically-offset positions such that a user can drive a variety of motorcycles to the stand, lean the motorcycle onto the top plate and quickly park the motorcycle.

2. Prior Art

Most motorcycles are provided with a collapsible kick stand (i.e. arm) for supporting the motorcycle in an inclined upright position during stationary storage thereof. The kick arm is normally secured at its upper end to a connecting bracket which mounts to the underside of the motorcycle frame centrally between the wheels, with the kick arm being swingable outwardly and downwardly to permit the free end thereof to engage the ground or floor. When in this position, the motorcycle can be supported by the kick arm but is nevertheless disposed in an angled or inclined position relative to the vertical. This orientation of the motorcycle, the substantial size and mass of the motorcycle, and the rather minimal support provided by the kick arm, hence result in the motorcycle being subject to tipping over, particularly when an external force of minimal magnitude is applied thereto. Because of the instability of the motorcycle when it is supported by the kick arm, most motorcycle dealers do not permit prospective customers to sit on motorcycles displayed in the showroom for fear that the motorcycle will tip over. A similar problem exists when motorcycles are stored in garages and the like since the kick arm does not provide the desired degree of safety and stability.

Other structures used for supporting a motorcycle are provided principally to permit support of the motorcycle when it is being maintained or serviced. Such devices typically involve low tables which are positioned under the central frame of the motorcycle so as to permit it to be supported in a slightly raised position. Other devices involve lift mechanisms having a pair of wheels so that one wheel of the motorcycle can be positioned on a part of the lift device, with the lift device then being rotated about its wheels so as to permit one wheel of the motorcycle to be lifted upwardly a small extent. These lift devices, intended principally for use when performing maintenance or service on the motorcycle, do not always provide the desired stability and, more specifically, are generally bulky and space-consuming. Further, they require lifting of one of the motorcycle wheels and hence such devices are unsuitable for normal parking or storage of the motorcycle.

Accordingly, a need remains for an adjustable motorcycle stand in order to overcome the above-noted shortcomings. The present invention satisfies such a need by providing an off-road motorcycle stand that is selectively adjustable between vertically-aligned and vertically-offset positions that is convenient and easy to use, lightweight yet durable in design, versatile in its applications, and designed for easily and conveniently enable a user to drive a variety of motorcycles to the stand, lean the motorcycle onto the top plate and quickly park the motorcycle.

BRIEF SUMMARY OF THE INVENTION

In view of the foregoing background, it is therefore an object of the present invention to provide an off-road motorcycle stand that is selectively adjustable between vertically-aligned and vertically-offset positions such that a user can drive a variety of motorcycles to the stand, lean the motorcycle onto the top plate and quickly park the motorcycle.

These and other objects, features, and advantages of the invention are provided by a motorcycle stand preferably including a base, a first support member connected to the base, and a second support member statically attached to the first support member such that the second support member is capable of engaging a portion of an existing motorcycle thereon. In this manner, the first support member may be selectively pivotal between vertically-aligned and vertically-offset positions relative to a centrally registered longitudinal axis of the base.

In a non-limiting exemplary embodiment, the first support member may be pivotally connected to the base in such a manner that the first support member is selectively articulated along an arcuate travel path extending between the vertically-aligned and vertically-offset positions.

In a non-limiting exemplary embodiment, the arcuate path may be located at a top end of the base such that the arcuate path intersects the centrally registered longitudinal axis.

In a non-limiting exemplary embodiment, the second support member may be registered along a horizontal axis when the first support member is at the vertically-aligned position wherein the horizontal axis is orthogonal to the centrally registered vertical axis.

In a non-limiting exemplary embodiment, the base preferably includes a bottom stabilizing section, a top stabilizing section vertically spaced above the bottom stabilizing section, and a plurality of support legs attached to the bottom and top stabilizing sections respectively. Such support legs preferably extend outwardly and away from the centrally registered longitudinal axis.

In a non-limiting exemplary embodiment, the bottom stabilizing section preferably includes first and second bottom brackets equidistantly offset from the centrally registered longitudinal axis. Such first and second bottom brackets may be statically connected to the support legs.

In a non-limiting exemplary embodiment, the top stabilizing section preferably includes first and second top brackets equidistantly offset from the centrally registered longitudinal axis. Such first and second top brackets may be anchored to the support legs and releasably attached to the first support member.

In a non-limiting exemplary embodiment, the top stabilizing section preferably includes first and second bars each connected to the first and second top brackets such that the first and second bars are intermediately positioned between the first and second top brackets.

In a non-limiting exemplary embodiment, the first support member may be located adjacent to the first bar when the first support member is articulated to the vertically-offset position.

In a non-limiting exemplary embodiment, the first support member may be located adjacent to the second bar when the first support member is articulated to the vertically-aligned position.

In a non-limiting exemplary embodiment, the first bar may be statically located at a first position offset from the centrally registered longitudinal axis and disposed towards an anterior side of the top stabilizing section. In this manner, the second bar may be statically located at a second position offset from the centrally registered longitudinal axis and disposed towards a posterior side of the top stabilizing section.

In a non-limiting exemplary embodiment, the first and second bars may be linear and registered parallel to each other. Such first and second bars may be located at axially opposed ends of the top stabilizing section.

In a non-limiting exemplary embodiment, the first support member preferably includes a female member and a male member adjustably connected thereto.

In a non-limiting exemplary embodiment, the second support member preferably includes a plate statically anchored to a top end of the first support member.

In a non-limiting exemplary embodiment, the motorcycle stand may further include an adaptor removably attached to the second support member. Such an adaptor preferably includes a tray removably positioned on the second support plate, and at least one pad disposed on a top surface of the tray.

In a non-limiting exemplary embodiment, the at least one resilient pad preferably includes a plurality of resilient pads spaced apart and oppositely seated at opposed edges of the tray.

In a non-limiting exemplary embodiment, the tray may have a pair of curvilinear edges frictionally fitted along opposed edges of the tray.

In a non-limiting exemplary embodiment, the motorcycle stand may further include a collection tray removably coupled to the base wherein the collection tray is located subjacent to the adaptor.

The present invention may further include a method of utilizing a motorcycle stand. Such a method preferably includes the steps of: providing a base; providing and connecting a first support member to the base; providing and statically attaching a second support member to the first support member; selectively pivoting the first support member between vertically-aligned and vertically-offset positions relative to a centrally registered longitudinal axis of the base; and the second support member engaging a portion of an existing motorcycle such that the motorcycle may be supported at a parked position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

Figure 1:
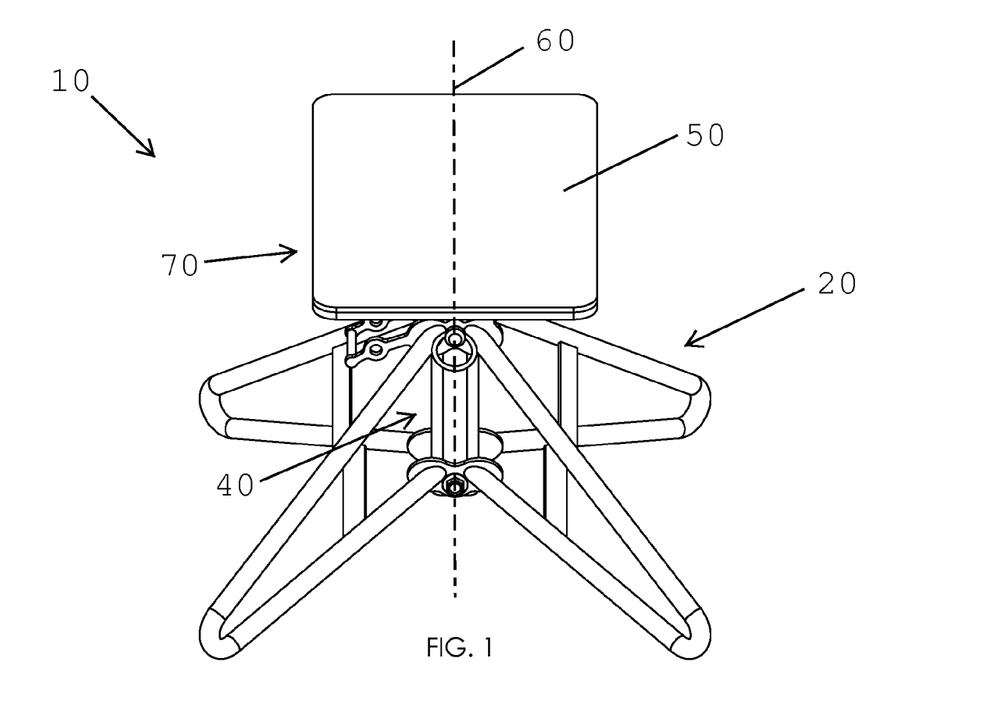
FIG. 1 is a perspective view showing a motorcycle stand oriented at a vertical position, in accordance with the present invention.
Figure 2:
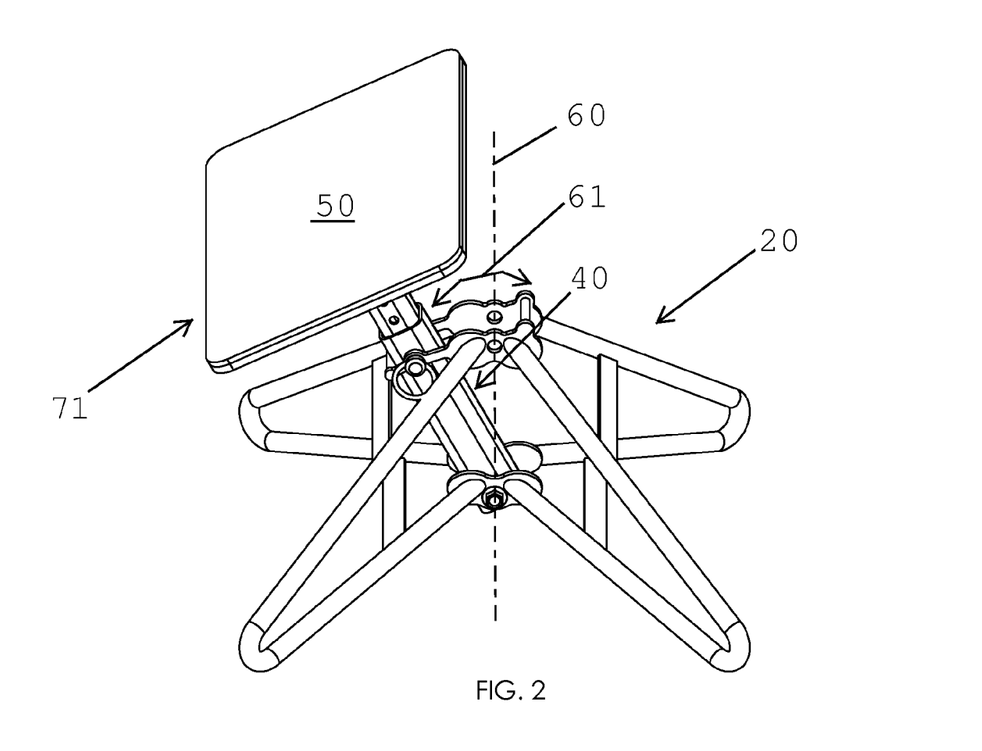
FIG. 2 is a perspective view showing the motorcycle stand tilted to a vertically-offset position.
Figure 3:
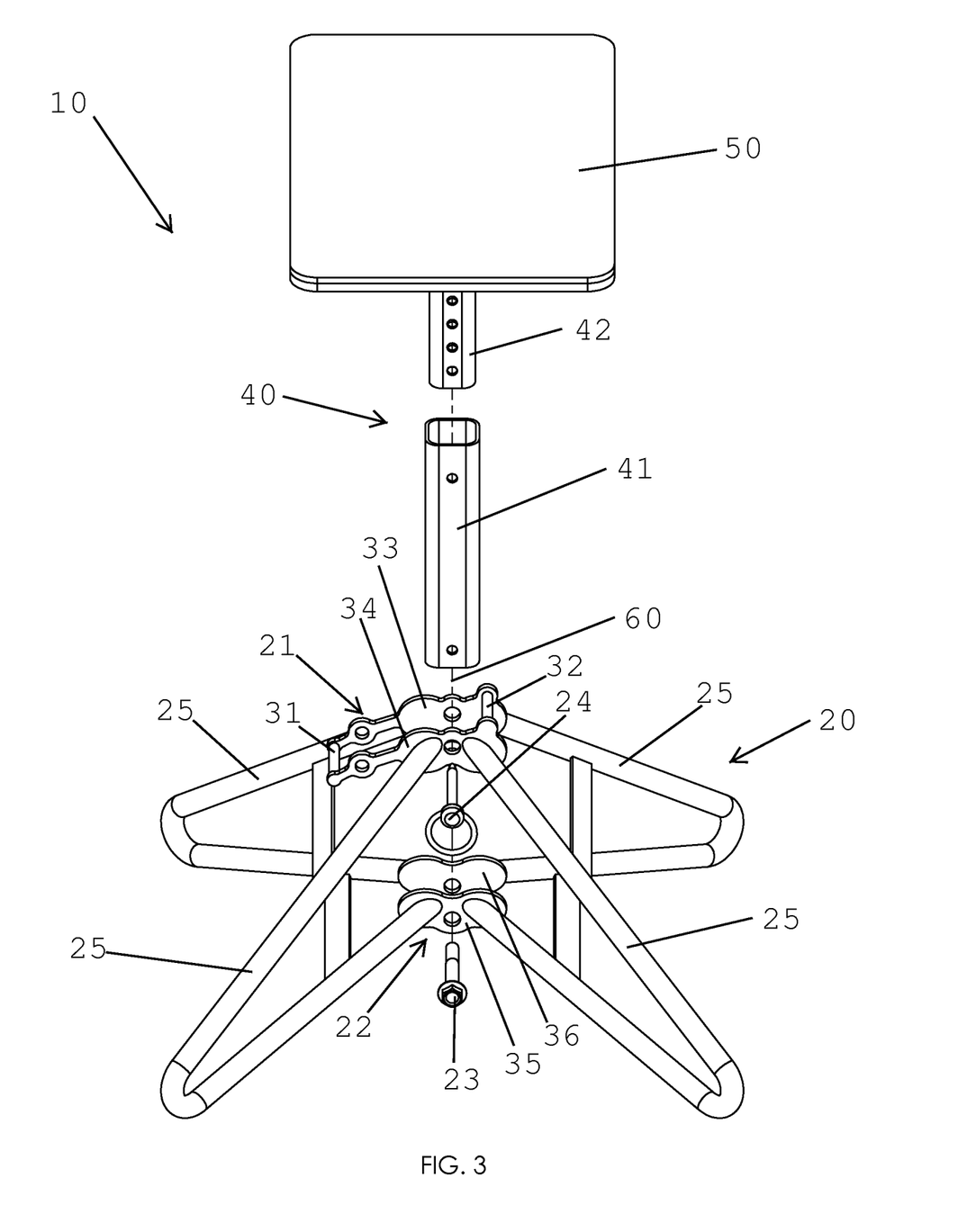
FIG. 3 is an exploded view showing the interrelationship between the major components of motorcycle stand shown in FIG. 1.
Figure 4:
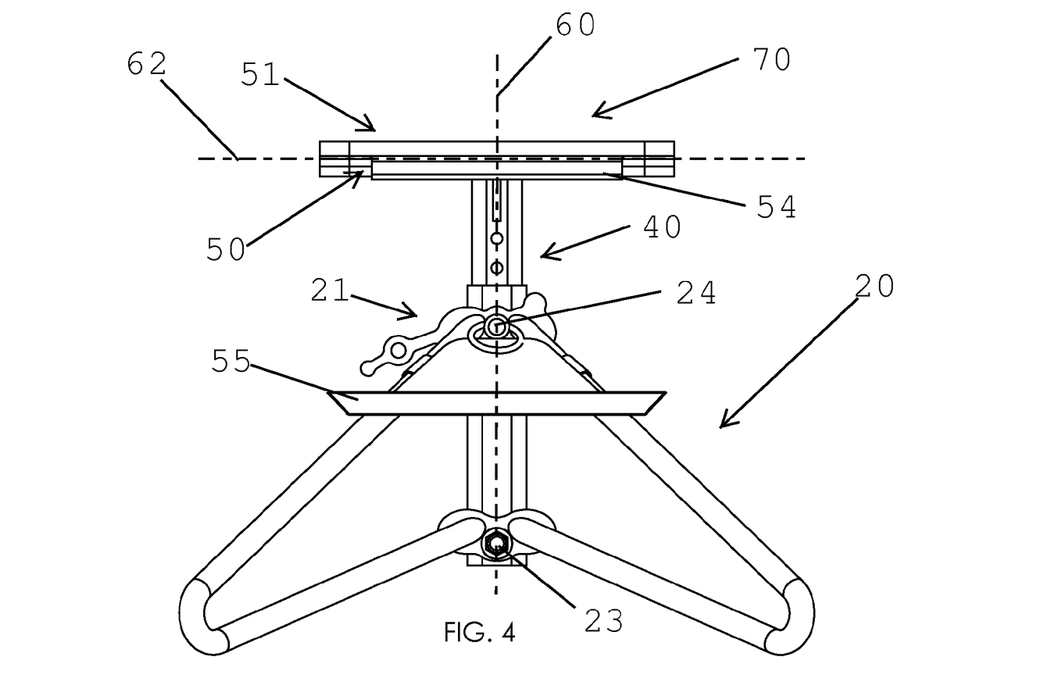
FIG. 4 is a side elevational view showing an alternate embodiment of the motorcycle stand, which is provided with an adaptor and collection pan.
Figure 5:
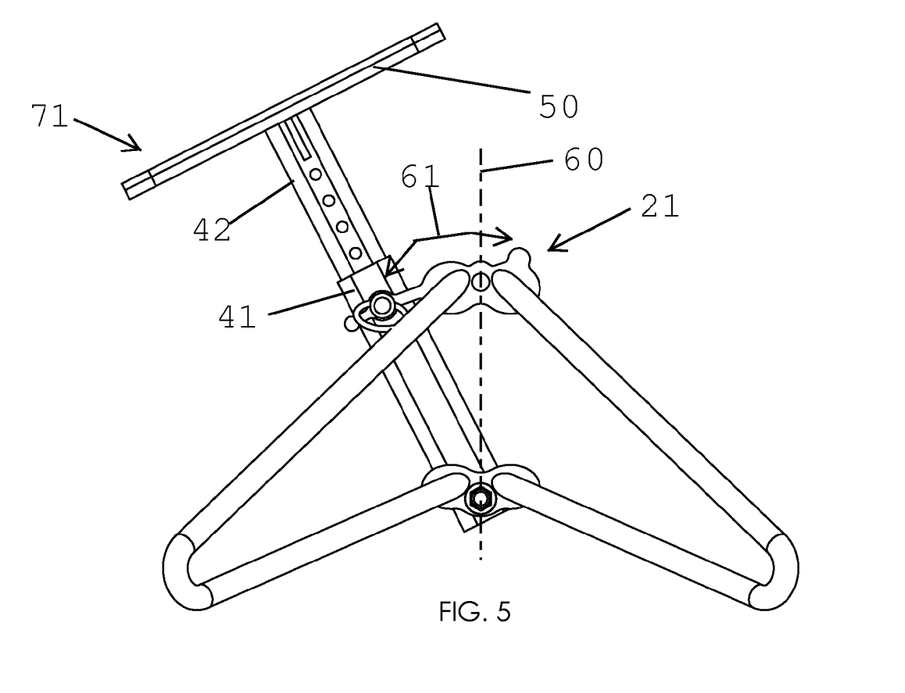
FIG. 5 is a side elevational view of the motorcycle stand shown in FIG. 1.
Figure 6:
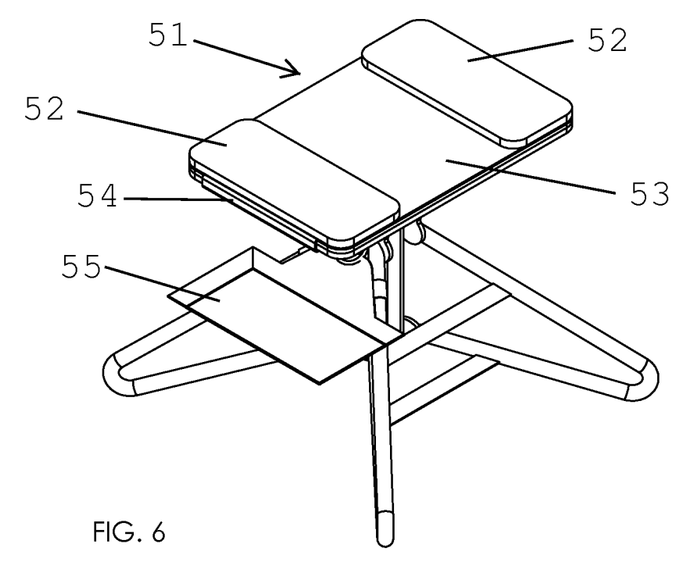
FIG. 6 is a perspective view of the motorcycle stand shown in FIG. 4.
Figure 7:
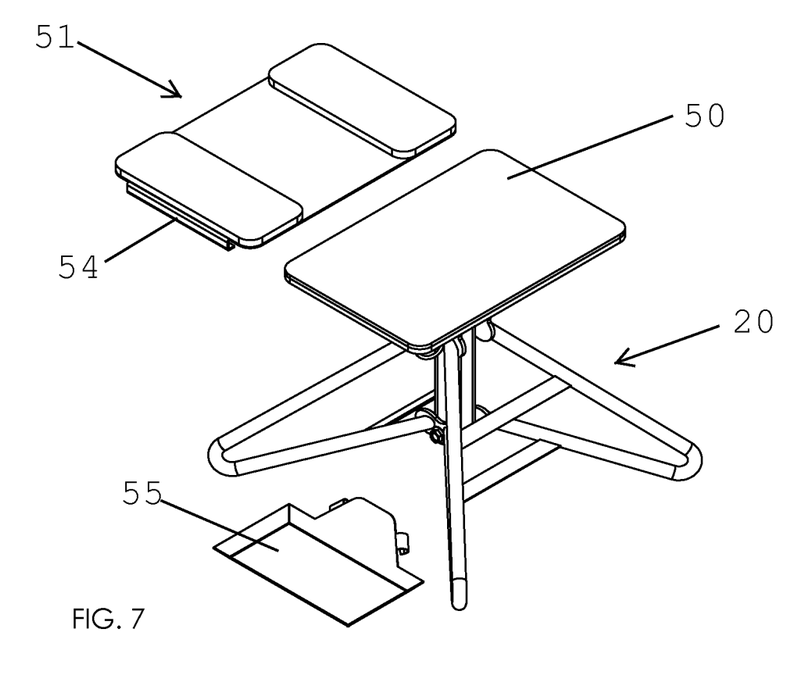
FIG. 7 is a partially exploded view showing the adaptor and collection pan detached from the motorcycle stand of FIG. 6.
Figure 8:
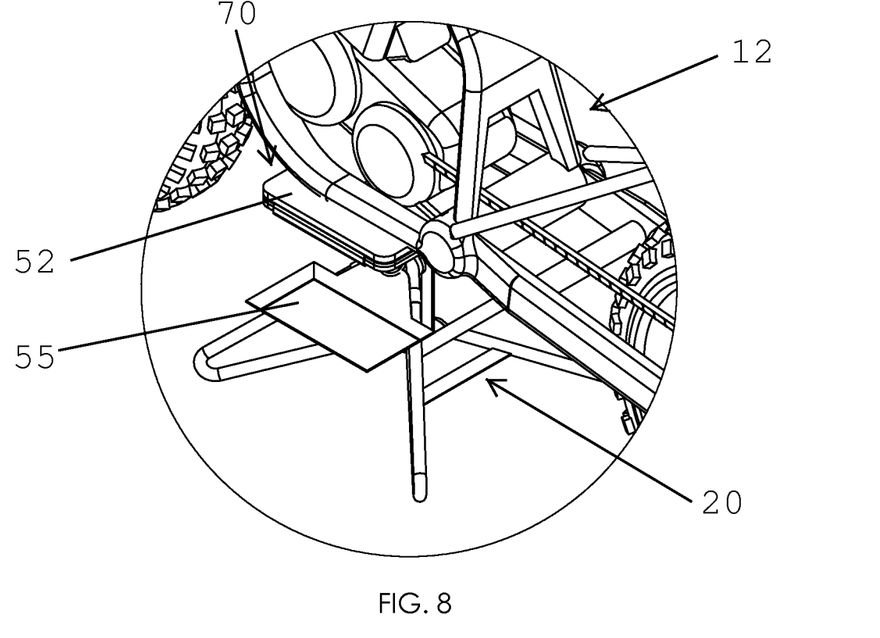
FIG. 8 is a perspective view showing the motorcycle stand of FIG. 6 disposed at a vertically-aligned orientation for supporting a non-limiting exemplary motorcycle at a parked position.
Figure 9:
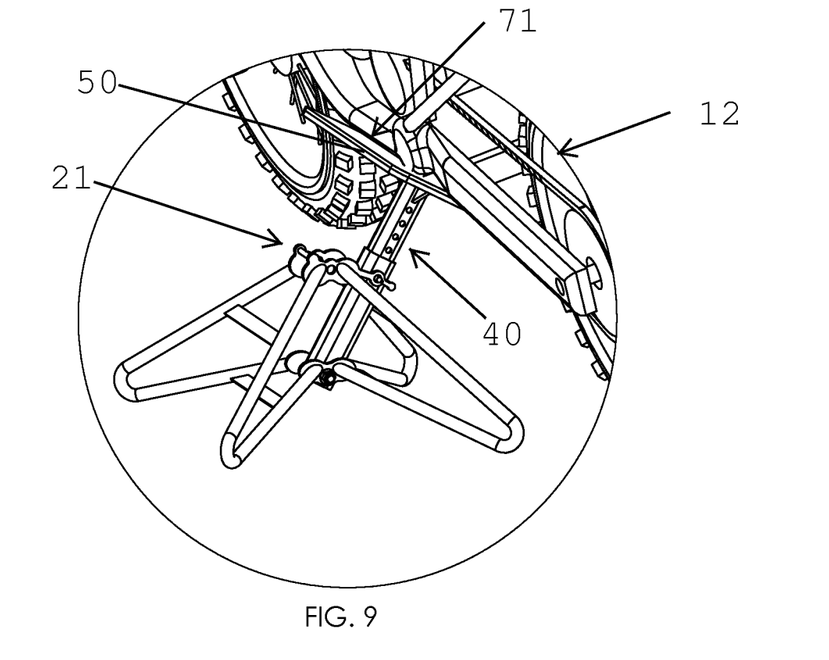
FIG. 9 is an enlarged view of section 8 circled in FIG. 8.
Figure 10:
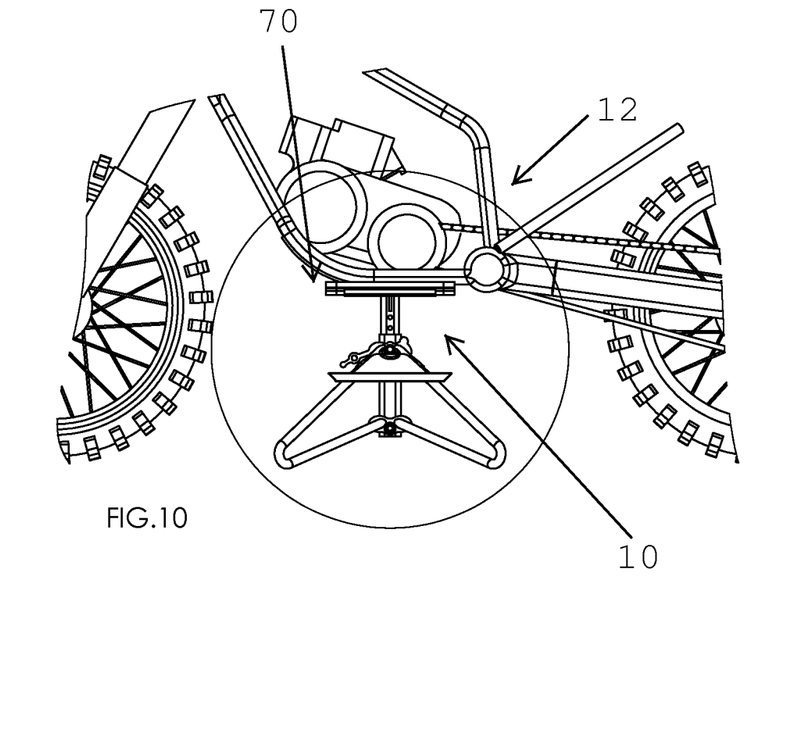
FIG. 10 is a perspective view showing the motorcycle stand of FIG. 6 disposed at a vertically-offset orientation for supporting a non-limiting exemplary motorcycle at a parked position.
Figure 11:
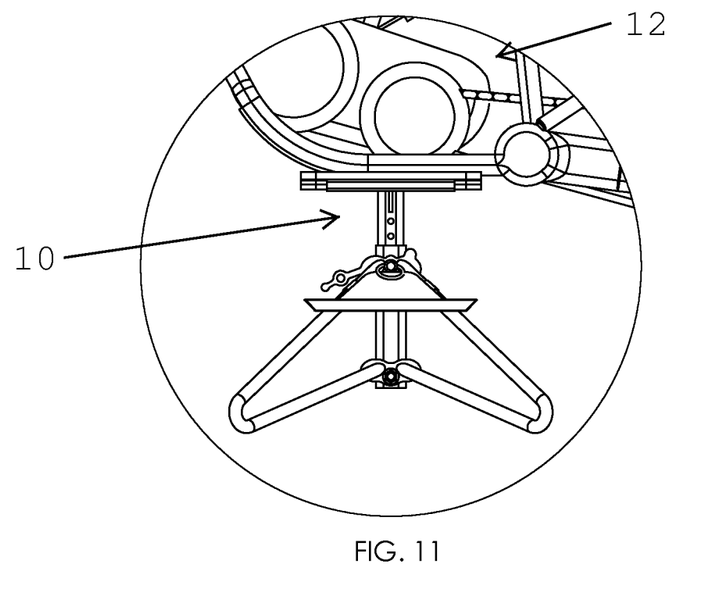
FIG. 11 is an enlarged view of section 10 circled in FIG. 10.
Figure 12:
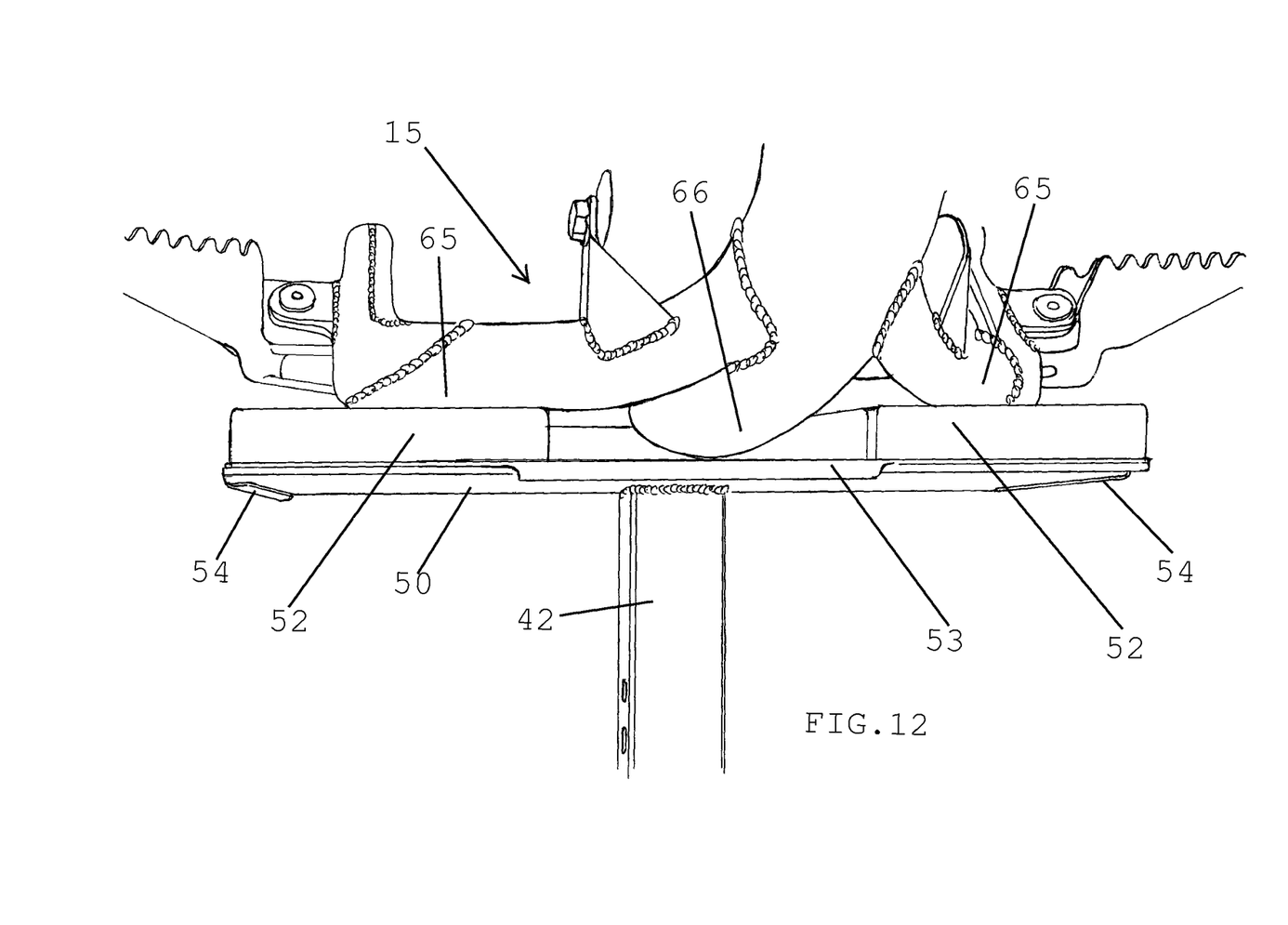
FIG. 12 is an enlarged view of the adaptor with pads and second support plate supporting a 1994-2010 Kawasaki KX85 off-road motorcycle for accommodating the down tube of such a motorcycle.

The apparatus of this invention is referred to generally in FIGS. 1-12 and is intended to provide an off-road motorcycle stand 10 that is selectively adjustable between vertically-aligned 70 and vertically-offset 71 positions such that a user can drive a variety of motorcycles to the stand 10, lean the motorcycle 12 onto the stand 10 and quickly park the motorcycle 12. It should be understood that the present invention may be used to support many different types of motorcycles, and should not be limited to any particular type of motorcycle 12.

Referring to FIGS. 1-12 in general, an off-road motorcycle stand 10 is selectively adjustable between vertically-aligned 70 and vertically-offset 71 positions such that a user can drive a variety of motorcycles to the stand 10, lean the motorcycle 12, 15 onto the stand 10 and quickly park the motorcycle 12, 15. Such a motorcycle stand 10 preferably includes a base 20, a first support member 40 connected to the base 20, and a second support member 50 statically attached to the first support member 40 such that the second support member 50 is capable of engaging a portion of an existing motorcycle 12 thereon. In this manner, the first support member 40 may be selectively pivotal between vertically-aligned 70 and vertically-offset 71 positions relative to a centrally registered longitudinal axis 60 of the base 20. Such a structural configuration provides the unexpected and unpredictable advantage of accommodating a variety of motorcycles, such as off-road motorcycles 12, 15, wherein a user is able to quickly and effectively position a bottom of a foot peg mount of the motorcycle on the second support member 50 and lean (park) the motorcycle.

In a non-limiting exemplary embodiment, the first support member 40 may be pivotally connected to the base 20 in such a manner that the first support member 40 is selectively articulated along an arcuate travel path 61 extending between the vertically-aligned 70 and vertically-offset 71 positions. Such a structural configuration provides the unexpected and unpredictable advantage of maintaining the base 20 at a stationary position while the first support member 40 is tilted to the vertically-offset 71 position.

As an example, a first fastener 23 may be positioned through the base 20 and the first support member 40 in such a manner that the first support member 40 can be selectively pivoted about the first fastener 23. Such a fastener may include a bolt having a non-threaded proximal end and a threaded distal end. A nut may be threadably engaged at the threaded distal end of the bolt so that the first support member 40 is pivotal about the first fastener 23. Of course, one skilled in the art understands there are a variety of ways for pivotally connected the first support member 40 to the base 20, without departing from the true scope of the invention.

In a non-limiting exemplary embodiment, the arcuate path 61 may be located at a top end of the base 20 such that the arcuate path 61 intersects the centrally registered longitudinal axis 60. In this manner, an upper end of the first support member 40 travels along the top end of the base 20 and maintains the second support member 50 spaced above the base 20 so that it can adequately leverage and support the motorcycle 12 at the parked position.

In a non-limiting exemplary embodiment, the second support member 50 may be registered along a horizontal axis when the first support member 40 is at the vertically-aligned 70 position. Such a horizontal axis is orthogonal to the centrally registered vertical axis. Such a structural configuration provides the unexpected and unpredictable advantage of maintaining the top surface of the second support member 50 at a level position when the first support member 40 is vertically-aligned 70.

In a non-limiting exemplary embodiment, the base 20 preferably includes a bottom stabilizing section 22, a top stabilizing section 21 vertically spaced above the bottom stabilizing section 22, and a plurality of support legs 25 attached to the bottom and top stabilizing sections 22, 21 respectively. Such support legs 25 preferably extend outwardly and away from the centrally registered longitudinal axis 60. Notably, a second fastener 24 may be employed to selectively and adjustably anchor the first support member 40 to the top stabilizing section 21 when the first support member 40 is displaced to the vertically-aligned 70 and vertically-offset 71 positions. Such a structural configuration provides the critical benefit of ensuring the first and second support members 50 are maintained at substantially stable positions after being displaced to the vertically-aligned 70 and vertically-offset 71 positions so that the motorcycle 12 weight is adequately supported at the leaned (parked) position. Of course, one skilled in the art understands that a variety of fasteners may be employed, such as a clevis pin, without departing from the true scope of the present invention.

In a non-limiting exemplary embodiment, the bottom stabilizing section 22 preferably includes first and second bottom brackets 35, 36 equidistantly offset from the centrally registered longitudinal axis 60. Such first and second bottom brackets 35, 36 may be statically connected to the support legs 25.

In a non-limiting exemplary embodiment, the top stabilizing section 21 preferably includes first and second top brackets 33, 34 equidistantly offset from the centrally registered longitudinal axis 60. Such first and second top brackets 33, 34 may be statically anchored to the support legs 25 and releasably attached to the first support member 40 via the second fastener 24.

In a non-limiting exemplary embodiment, the top stabilizing section 21 preferably includes first and second bars 31, 32 each connected to the first and second top brackets 33, 34 such that the first and second bars 31, 32 are intermediately positioned between the first and second top brackets 33, 34.

In a non-limiting exemplary embodiment, the first support member 40 may be located adjacent to the first bar 31 when the first support member 40 is articulated to the vertically-offset 71 position. Such a structural configuration provides the unexpected and unpredictable advantage of ensuring the first and second support members 50 do not pivot beyond a first maximum point defined by the first bar 31.

In a non-limiting exemplary embodiment, the first support member 40 may be located adjacent to the second bar 32 when the first support member 40 is articulated to the vertically-aligned 70 position. Such a structural configuration provides the unexpected and unpredictable advantage of ensuring the first and second support members 50 do not pivot beyond a second maximum point defined by the second bar 32.

In a non-limiting exemplary embodiment, the first bar 31 may be statically located at a first position offset from the centrally registered longitudinal axis 60 and disposed towards an anterior side of the top stabilizing section 21. The second bar 32 may be statically located at a second position offset from the centrally registered longitudinal axis 60 and disposed towards a posterior side of the top stabilizing section 21. The distance between such first and second bars 31, 32 defines the travel path of the first support member 40 along the arcuate path 61.

In a non-limiting exemplary embodiment, the first and second bars 31, 32 may be linear and registered parallel to each other. Such first and second bars 31, 32 may be located at axially opposed ends of the top stabilizing section 21 for maximizing the longitudinal length of the arcuate path 61. Such a structural configuration permits the first and second support members 40, 50 to be adequately tilted and support the motorcycle at a leaned (parked) position.

In a non-limiting exemplary embodiment, the first support member 40 preferably includes a female member 41 and a male member 42 adjustably connected thereto. Such female and male members 41, 42 may be telescopically mated and provided with a plurality of apertures for receiving the second fastener 24 therethrough, for example.

In a non-limiting exemplary embodiment, the second support member 50 preferably includes a plate statically anchored to a top end of the first support member 40.

In a non-limiting exemplary embodiment, the motorcycle stand 10 may further include an adaptor 51 removably attached to the second support member 50. Such an adaptor 51 preferably includes a tray 53 removably positioned on the second support member 50, and at least one pad 52 disposed on a top surface of the tray 53. Such a non-limiting exemplary embodiment preferably assists a user to lean (park) a 1994-2010 Kawasaki KX85 off-road motorcycle 15. As perhaps best shown in FIG. 12, the 1994-2010 Kawasaki KX85 off-road motorcycle 15 has a frame with a single down tube 66 that extends from the steering neck assembly down under the motor to a cross-brace located just behind the motor. Such a down tube 66 sits lower than the two side rails 65 of the frame making it unsteady for the bike to lean (park) on conventional motorcycle stands. Such an embodiment overcomes this prior art shortcoming by employing a plurality of resilient pads 52. Such pads 52 may be ⅝" thick and may be formed from NEOPRENE rubber glued to a tray 53 that is fitted over the second support member 50. When the adaptor 51 is fitted over the second support member 50, the motorcycle's side rails 65 are able to carry the weight and stabilize the motorcycle 15 for permitting the down tube 66 to pass between the pads 52 and thereby avoid the down tube 65 from contacting the top surface of tray 53. Of course, pads 52 may be permanently affixed directly to the top surface of the second support member 50 without employing a tray 53.

In a non-limiting exemplary embodiment, the at least one resilient pad 52 preferably includes a plurality of resilient pads 52 spaced apart and oppositely seated at opposed edges of the tray 53.

In a non-limiting exemplary embodiment, the tray 53 may have a pair of curvilinear edges 54 frictionally fitted along opposed edges of the second support member 50.

In a non-limiting exemplary embodiment, the motorcycle stand 10 may further include a collection tray 55 removably coupled to the base 20 wherein the collection tray 55 is located subjacent to the adaptor 51.

The present invention may further include a method of utilizing a motorcycle stand 10. Such a method preferably includes the steps of: providing a base 20; providing and connecting a first support member 40 to the base 20; providing and statically attaching a second support member 50 to the first support member 40; selectively pivoting the first support member 40 between vertically-aligned 70 and vertically-offset 71 positions relative to a centrally registered longitudinal axis 60 of the base 20; and the second support member 50 engaging a portion of an existing motorcycle 12 such that the motorcycle 12 may be supported at a parked position. Such method steps provide the unexpected and unpredictable advantage of accommodating a variety of motorcycles 12, 15, such as off-road motorcycled, wherein a user is able to quickly and effectively position a bottom of a foot peg mount of the motorcycle on the second support member 50 and lean (park) the motorcycle with minimal effort.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A motorcycle stand comprising:
a base;
a first support member connected to said base; and
a second support member attached to said first support member, said second support member being capable of engaging a portion of an existing motorcycle thereon;
wherein said first support member is adjustable between vertically-aligned and vertically-offset positions relative to a centrally registered longitudinal axis of said base;
wherein said base comprises
a bottom stabilizing section;
a top stabilizing section vertically spaced above said bottom stabilizing section; and
a plurality of support legs attached to said bottom and top stabilizing sections respectively;
wherein said support legs extend outwardly and away from said centrally registered longitudinal axis;
wherein said bottom stabilizing section comprises: first and second bottom brackets equidistantly offset from said centrally registered longitudinal axis, said first and second bottom brackets being statically connected to said support legs.

2. The motorcycle stand of claim 1, wherein said first support member is pivotally connected to said base in such a manner that said first support member is selectively articulated along an arcuate path extending between said vertically-aligned and vertically-offset positions.

3. The motorcycle stand of claim 2, wherein said arcuate path is located at a top end of said base and intersects said centrally registered longitudinal axis.

4. The motorcycle stand of claim 1, wherein said second support member is registered along a horizontal axis when said first support member is at said vertically-aligned position, said horizontal axis being orthogonal to said centrally registered vertical axis.

5. The motorcycle stand of claim 1, wherein said top stabilizing section comprises: first and second top brackets equidistantly offset from said centrally registered longitudinal axis, said first and second top brackets being anchored to said support legs and releasably attached to said first support member.

6. The motorcycle stand of claim 5, wherein said top stabilizing section comprises: first and second bars each connected to said first and second top brackets such that said first and second bars are intermediately positioned between said first and second top brackets.

7. The motorcycle stand of claim 6, wherein said first support member is located adjacent to said first bar when said first support member is articulated to said vertically-offset position.

8. The motorcycle stand of claim 6, wherein said first support member is located adjacent to said second bar when said first support member is articulated to said vertically-aligned position.

9. The motorcycle stand of claim 6, wherein said first bar is statically located at a first position offset from said centrally registered longitudinal axis and disposed towards an anterior side of said top stabilizing section, wherein said second bar is statically located at a second position offset from said centrally registered longitudinal axis and disposed towards a posterior side of said top stabilizing section.

10. The motorcycle stand of claim 6, wherein said first and second bars are linear and registered parallel to each other, wherein said first and second bars are located at axially opposed ends of said top stabilizing section.

11. The motorcycle stand of claim 1, wherein said first support member comprises: a female member and a male member adjustably connected thereto.

12. The motorcycle stand of claim 1, wherein said second support member comprises: a plate statically anchored to a top end of said first support member.

13. The motorcycle stand of claim 1, further comprising: an adaptor removably attached to said second support member, said adaptor including
a tray removably positioned on said second support member; and
at least one pad disposed on a top surface of said tray.

14. The motorcycle stand of claim 13, wherein said at least one resilient pad comprises: a plurality of resilient pads spaced apart and oppositely seated at opposed edges of said tray.

15. The motorcycle stand of claim 14, wherein said tray has a pair of curvilinear edges frictionally fitted along said opposed edges of said tray.

16. The motorcycle stand of claim 1, further comprising: a collection tray removably coupled to said base and located subjacent to said adaptor.

* * * * *